May 31, 1932. H. R. RILEY 1,861,135
FURNACE CONSTRUCTION
Filed Dec. 3, 1928 4 Sheets-Sheet 2

Harry R. Riley INVENTOR
BY Victor J. Evans
ATTORNEY

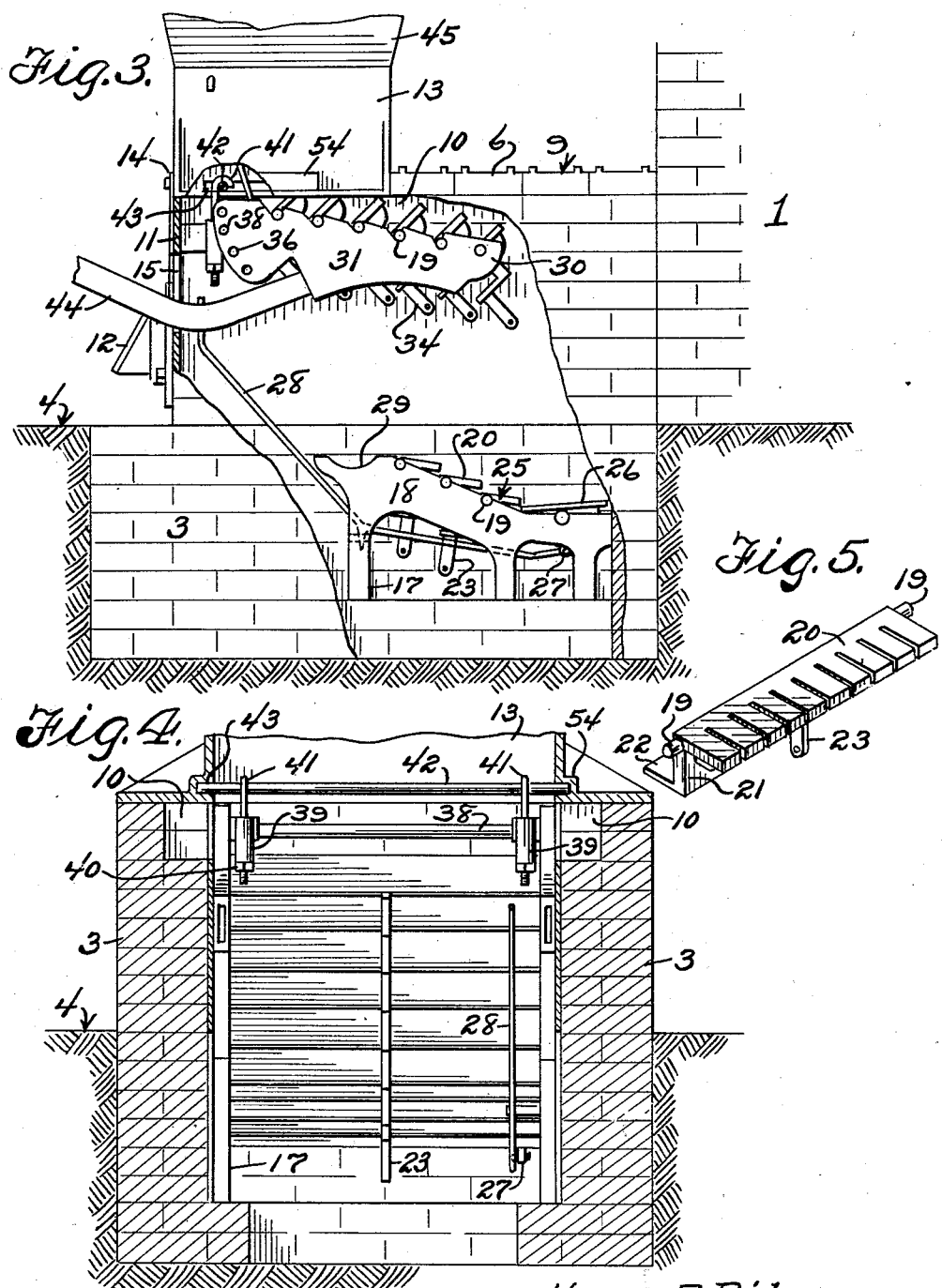

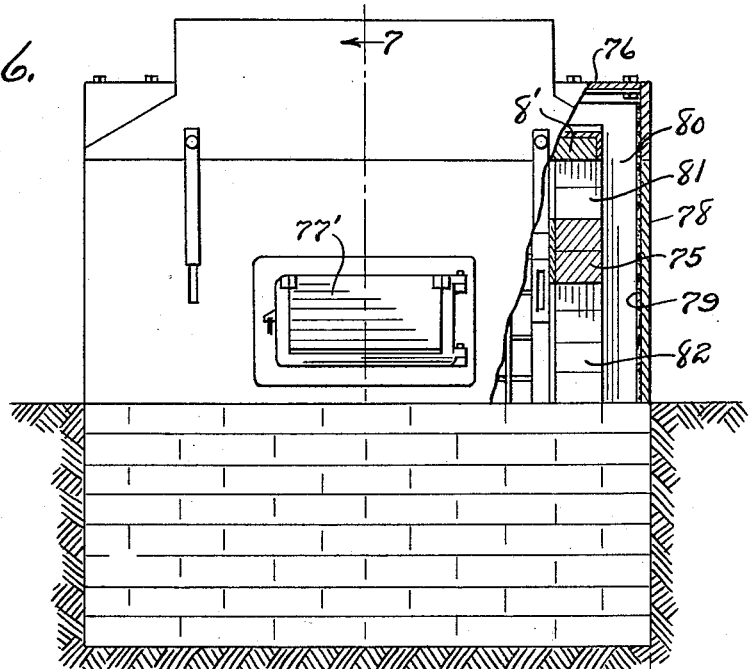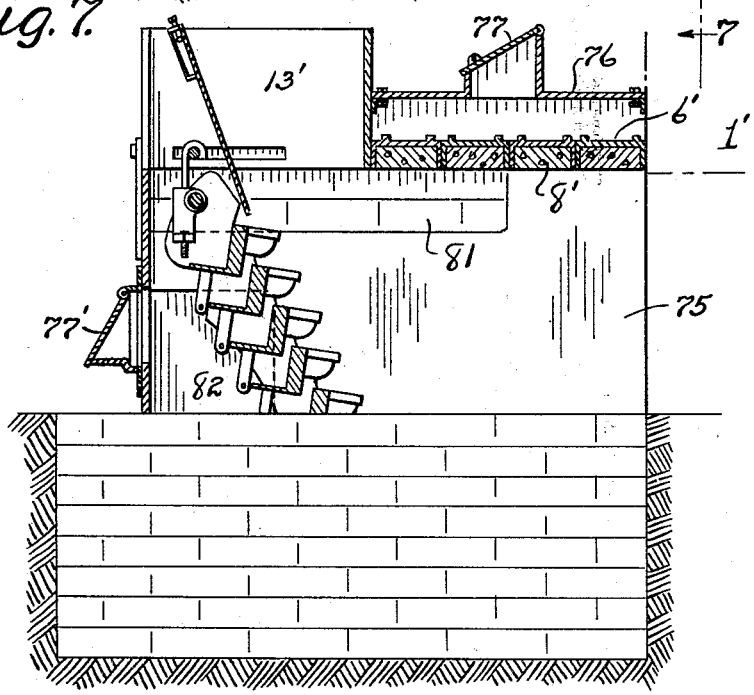

Patented May 31, 1932

1,861,135

UNITED STATES PATENT OFFICE

HARRY R. RILEY, OF BEND, OREGON

FURNACE CONSTRUCTION

Application filed December 3, 1928. Serial No. 323,291.

My present invention has reference to a heating device or burner for furnaces, boilers and like heating plants, my primary object being the provision of a burner which employs as its fuel either saw dust or manufactured saw dust commonly termed "hog fuel" and in which the parts are so constructed, arranged and associated with the furnace or boiler that only the heated gas from the fuel will be admitted into the heating plant and further wherein a greater amount of heat will be produced at a minimum consumption of saw dust than has to my knowledge heretofore been obtained.

A further object is the provision of a saw dust or hog fuel burner which is built in a line with and sealed to the plant to be heated and which is provided with a hopper of a novel construction, material obstructing elements in such hopper to prevent the clogging of material fed thereinto and to insure the proper feeding of the material onto the grates of the improvement, the said grates being also of a novel construction and involve an upper stepped section and a lower stepped section, the upper section being in the nature of a gasifier which is heated from the burning fuel on the lower section to a dull red heat and whereby such heat drives the gas that is in the fuel out into the fire box of the boiler, furnace or like heating plant and further wherein the natural draft of the flue draws this gas into the fire box where it is mixed with air from the draft door, the fuel on the lower lip or bottom of the grate is a charcoal fire from charred saw dust after the gas is driven out of it and is very hot, clean, and, of course, heats and gasifies the fuel on the upper section of the grate and further wherein because of the deep layer of green fuel on the grates none of the fire on the grates or under the grates ever reaches the boiler firebox so that the firebox of the heating plant is heated wholly from the gas obtained from the wood.

For a full and comprehensive understanding of the invention reference is to be had to the drawings which accompany and form part of this application.

Figure 3 is a detail elevation with parts in section showing the upper grate section raised to permit of the fire box in the heating plant being cleaned.

Figure 4 is a sectional view approximately on the line 4—4 of Figure 2.

Figure 5 is a perspective view of one of the grate bars.

Figure 6 is a front elevation, with parts in section illustrating a slight modification.

Figure 7 is a sectional view approximately on the line 7—7 of Figure 6.

Figure 1:
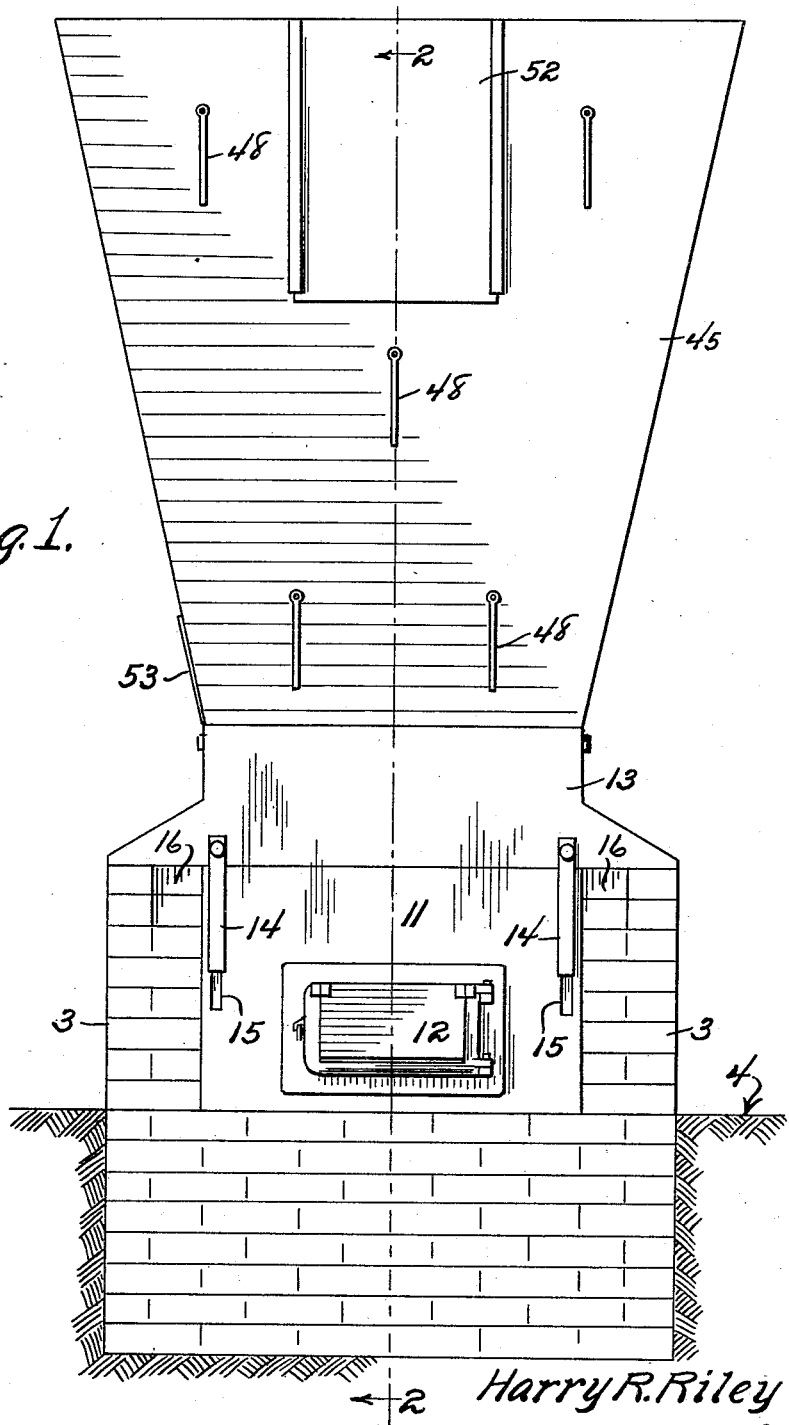
Figure 1 illustrates a front elevation of the improvement in applied position.

My improved saw dust or hog fuel burner is erected along the side of a heating plant, 1, in a line with the door that is directly below the grates in the said heating plant. To accomplish this I dig a pit of a determined size and depth and wall up this pit with fire brick which is thoroughly wet and which is dipped in a thick batter of straight Portland cement and water, no sand being employed. This provides the ash pit of the improvement. The door of the heating plant is removed and the side walls of the pit, indicated by the numeral 3, project a suitable distance above the floor line 4 which is level with the front of the pit. The rear and top of the walls 3, directly above the door opening of the fire box 5 of the heating plant is covered by contacting substantially U-shaped cast iron plates 6 which have embedded therein cement and fire clay 8. This roof 9 provides the upper wall of the combustion chamber as will hereinafter be apparent.

The side walls from the front of the construction just described and below the top or roof 9 have at least two of the bricks omitted to provide a side air vent which is indicated by the numeral 10. The open front of the masonry structure just described above the pit and from the floor 4 is covered by a metal plate 11. This plate is provided, adjacent to its bottom with an outwardly disposed angularly arranged inspection door 12, the door being also employed for another purpose which will hereinafter be described.

The plate 11 may be integrally formed with a substantially hood-shaped member 13 which is disposed over the masonry work outward of the top 9 thereof, the said hood, of course, being constructed of metal. The hood has pivoted thereto metal straps 14 which are normally disposed over openings 15 in the plate 11 and these straps are designed to engage with and hold the handles of the upper grates when the said handles are moved through the openings 15, as disclosed by Fig. 3 of the drawings. The masonry structure, at the sides of the plate 11, is provided with air inlet openings 16 which communicate with the fresh air vents 10. These openings 16 receive draft through the draft door after it enters the pit. The openings 16 are closed by the plate 11.

In the hollow and substantially rectangular masonry structure above described and resting on the bottom walls thereof there are the legs 17 of the side irons 18 that support the lower grate bars thereon. The outer series of grate bars are stepped and have rounded portions or trunnions 19 that are received in openings in the side members 18. The angle tops of the grate bars provide what I will term shelves and which are indicated by the numerals 20. In a line with the juncture of the shelves the grate bars are provided with depending angle portions 21 and further formed with outwardly extending right-angular flanges 22. The portions 22 are formed with depending lugs 23, and these lugs are pivotally connected to a bar 24 which holds all of the sections of the lower grate in proper alinement. The bar 24 may have removably connected therewith a rod whereby the lower grate indicated for distinction by the numeral 25 may be shaken, the rod, of course, passing through the opening closed by the door 12. In addition to the grate 25 there is arranged in the ash pit and centrally trunnioned on the member 18 a flat rocking plate 26 that has a lower lug 27 to which is attached a rod 28 designed to have one end received through the opening closed by the door 12 for rocking this plate. As disclosed by the drawings the bottom of the grate 26 is formed with a continuous flange which reinforces and strengthens the same.

Figure 2:
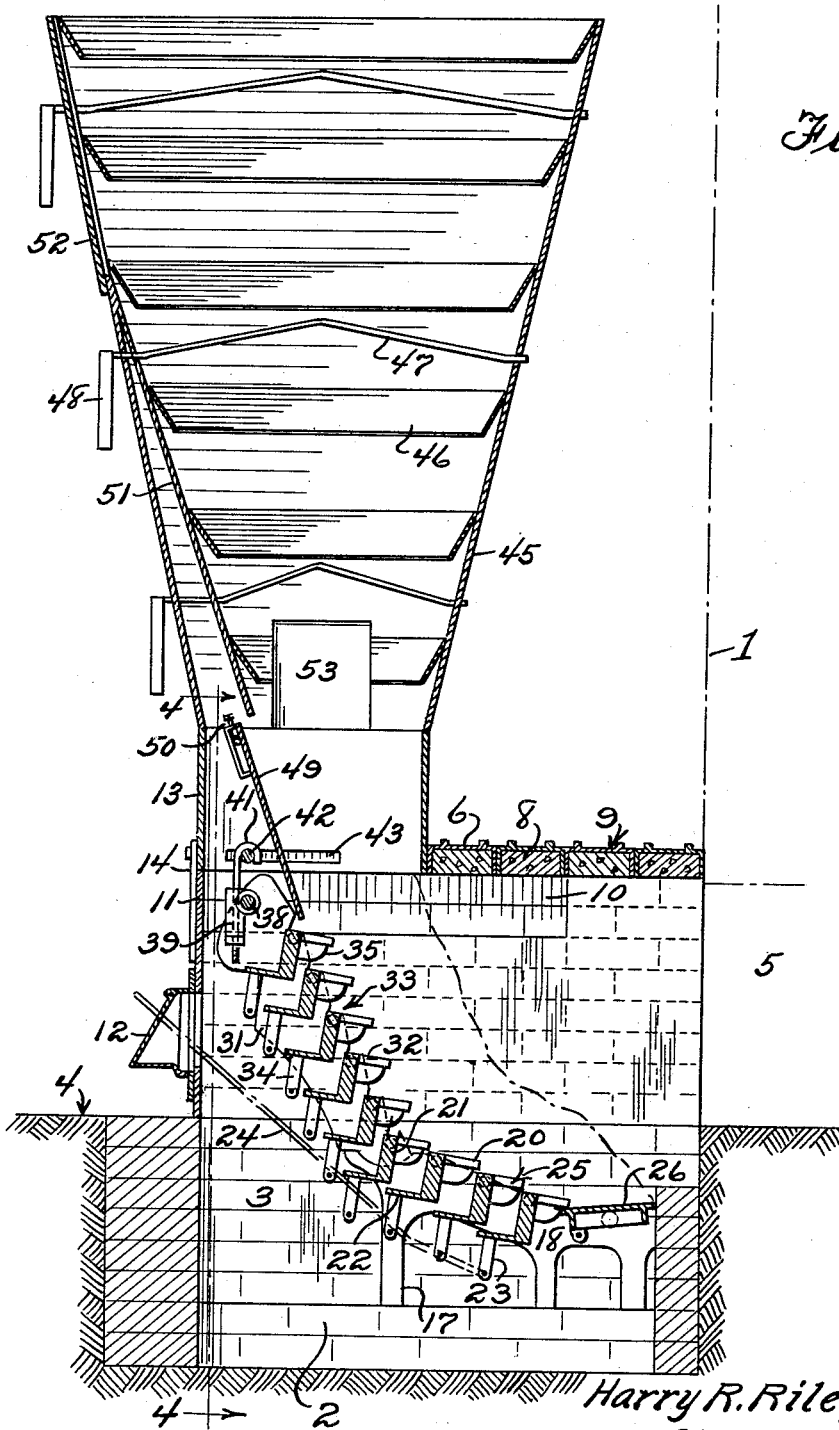
Figure 2 is a sectional view approximately on the line 2—2 of Figure 1.

The side members 18 of the support for the grate 25 have their upper and outer edges concaved, as at 29, and these concaved edges are designed to receive therein the convex edges 30 on the side bars or plates 31 for the upper series of grate bars 32. The grate 25 is arranged at a downward angle with respect to the grate 26 and by reference to figure 2 of the drawings it will be seen that the grate bars 32 of the upper grate 33 are arranged at a slight downward angle with respect to the grate 25. The grate bars 32 are formed the same as the grate bars of the grate 25, and preferably have depending lugs 34 connected by a rod for steadying all of the bars. It should be stated that each of the grates 33 and 25 have their outer portions or shelves reinforced by flanges 35 which are connected to the central depending portions of the said grate bars.

The upper or outer end of the side members 31 for the upper grate 33 are provided with a series of equidistantly spaced arcuately arranged apertures 36 through any pair of which there is passed the ends of a rod 38. This rod is provided or has formed therewith adjacent to its ends socket members 39 and through each of these socket members there is passed and adjustably secured by means 40 a hook 41. The shanks of the hooks are threaded and the means 40 are in the nature of nuts which are screwed on the said threaded ends of the shanks. The hooks 41 are brought over a rod 42 which has its ends slidably arranged in slots or depressions 43 on the inner sides of what I have termed the hood-shaped member 13. By this arrangement it will be noted that the upper grate member 33 may be arranged at desired angles with respect to the lower grate member 20, and by the engagement of the end 30 with the concaved portions 29 and the side elements 18 of the lower grate such adjustment is readily compensated for although it is to be noted that when the ends 30 of the side members are brought into the concaved portions 29 of the side supports 18 the upper grate member 33 will be firmly supported.

One or both of the side members 31 of the upper grate 33 is provided with a socket for the reception of a removable and angle handle member 44 whereby the upper grate member may be swung to a position illustrated by Figure 3 of the drawings, the upper grate member being only swung to this position when it is desired to clean out the ash pit of the furnace or other heating plant to which the burner is attached.

The member 13 may be either formed with or may have centrally secured thereto for communication therewith a hopper 45. This hopper throughout its length is formed or provided with spaced downwardly directed inclined baffle plates 46 and between certain of these baffle plates there is hingedly supported in the hopper the angle rods 47. Each of the rods 47 has on one of its ends a weighted arm 48, the purpose of this construction will presently be described. In the portion 13 there is an angularly disposed fuel directing plate 49. Means 50 is provided for vertically adjusting this plate. Above the plate 49, slightly inward thereof and arranged at an angle with respect to one of the side walls of the hopper 45 there is a shield plate 51 and to this shield plate certain of the lower baffles 46 are secured. The shield plate not only provides a space whereby the adjustable element 50 may be reached to regulate the position of the directing plate 49, but also serves as a heating space to pre-heat the wet fuel in the hopper. Heat from the ash pit rises through hood 13 and causes a swelling of the fuel so that the said fuel will move should it clog the hopper by being wet.

The hopper 45, adjacent to its top and upon its outer face is provided with a normally closed door 52 in which the fuel is inserted. In addition to this the hopper 45 from its juncture with the part 13 is provided on one of its sides with a second normally closed door 53. This door permits the placing of kindling into the grates to start the fire. The burner front or the draft door 12 provides access for adjusting the elements and slidable directing plate 49, as well as the regulation of the rod 42 in its slots or housings 54 and the adjustment of the nuts 40 on the stems of the hooks 41.

The grate section 26 is in the nature of a dump grate, the grate sections 25 and 33 being in the nature of burning grates. Each grate has its own gasifier at the top or upper edge thereof, that is, the square fingers 20′ provided between the slits 20″, the said fingers being projected into the fuel with the lip or flange 22 on the lower part of the grate that holds the charred fuel after the gas has passed out of it, the fuel thus becoming charcoal which ignites on this portion 20 of the grate as it is falling through the upper to the lower part of the said grate. This burning charcoal heats the upper portion of the grate and causes the grate sections disposed one above another to become red hot on the gasifier fingers 20′ which drives the gas out of the fuel over the entire grate area except the dump grate.

All of the grates except the dump grate are held open as much as possible just so unburned fuel does not drop into the ash pit 2. Green saw dust or hog fuel is fed into the hopper. The deflector plates 46 direct the fuel onto the grates. The V-shaped or angle obstruction rods 47 prevent the fuel from bunching. These elements are automatic in their action, that is, the same will swing by the weight of the fuel thereon to different angle positions and when the fuel is released therefrom will return to their initial positions as disclosed by Figure 2 of the drawings. As stated, the upper grates 33 are in the nature of gasifiers. These grates are heated red hot. The green saw dust falls over these hot grates and produces a gas. The gas is drawn into the fire box 5 of the heating plant 1, after being mixed with air drawn through the air vents 10 and being subjected to the fire produced on the lower grates 25. The fire from these grates gives out a blue flame, similar to that of an ordinary gas burner.

After the gas is out of the saw dust it becomes charred and falls onto the lips on the lower grate and burns to heat the upper grate. After the charcoal is consumed the ash falls into the pit. This action is kept up as long as fuel is in the hopper. When the burner is fired heavily the grates should be well shaken and after shaking the grates the ash should not be removed from the pit as there may be saw dust that falls through the grates, which if left in the pit will burn slowly without flame. The fire in the grates is not the fire that heats the boiler or plant 1. The heat from this fire is lost as far as the heating plant is concerned. This is the heat used to drive the gas out of the saw dust and this gas burns in the fire box 5 of the plant 1. Dry or inflammable fuel is not to be placed in the hopper as the same is apt to cause a fire. If it is necessary to use dry fuel it should be wetted with water before putting it into the hopper. Only green fuel or fuel that has been dried, then wet again with water so that the same will not readily burn again is safe to use. With the improvement gasoline or other inflammable material could be poured into the hopper without any disastrous effect. Of course, such fluids are not intended for use in the hopper. From experience it has been found necessary that the hopper should be emptied at least once each month, according to the way the burner is used. To do this the grates should be raised and cleaned of fine ashes, such ashes being also removed from the fire box. Thermostats and pressure regulators used on the old system can be attached to the burner draft but a check valve instead of a damper must be employed in the fuel outlet pipe of the plant 1 so that the burner draft will open as the check draft closes and vice versa.

Also from experience I have found that steam pressure in boilers equipped with my improvement will not vary one pound or the temperature of the thermostat will not vary over one degree.

By reference to Figure 5 of the drawings it will be noted that the shelf or ledge plates of the grates 25 and 33 are slitted from their outer edges to permit of the free passage of air therethrough as well as the falling through such slits of small particles of burned material.

With the improvement no smoke flows through the stack of the plant 1. In the event of the operator observing a white smoke or vapor he will realize that all of the gases from the fuel are not properly consumed and will regulate the drafts accordingly. The quantity of fuel delivered onto the grates is indicated by the dotted lines in Figure 2 of the drawings and the portion of the masonry therebeyond provides the combustion chamber.

In Figures 6 and 7 I have illustrated a slight modification which discloses a different manner of circulating the air and for preheating such air in its circulation. In the main the structure is similar to that previously described, the device having its open end disposed opposite the boiler or like heating plant 1'. The masonry structure above the pit 3', and indicated for distinction by the numeral 75 is of a less thickness than the masonry structure heretofore described. As the grates are similar to those previously described, the construction and arrangement thereof will not be entered into. Above the plates 6', the fire clay or bricks 8' that are disposed to the rear of the hood or hopper base 13' I secure by suitable means a plate which I will term a sub-top and which is indicated by the numeral 76. The sub-top 76 is provided with an air inlet opening that is surrounded by an upstanding flange and hingedly secured on the top of this flange there is a draft door 77. The sub-top 76 extends beyond the side walls of the masonry work 75 and has bolted, riveted or otherwise secured to its outer edges metal plates 78 whose inner faces are lined with cellular asbestos 79. Between the sheets 79 and the masonry 75 there is provided an air passage 80, which, of course, communicates with the pit and likewise communicates with the air passages or openings 81 and 82 in the side walls of the masonry 75.

The draft door, indicated by the numeral 77 is, of course, arranged at the front of the device.

All air enters the draft door 77 on the top of the burner and between the burner proper and the boiler or heating plant 1 and passes downwardly through the draft openings and goes to each side through the vents or passages 80 to the sides of the burner and passes toward the front of the burner on each side thereof to the openings 82 at the lower front portion of the ash pit. Thus instead of the air entering the burner cold through the usual draft door in the front of the device all air is preheated and put into the ash pit hot. This burns the wet fuel more effectively, creates better combustion and keeps the outside of the burner cool so that it will radiate no heat except from the fire box to the boiler or heating plant 1'. The air that passes through the hot passages goes into the ash pit and from thence to the grates, also through the passage 81 (as it did originally) to enter the firebox of the heating plant to produce the blue flame.

Having described the invention, I claim:

1. A fuel burning structure of the class described comprising a fire box, and an ash pit, upper and lower grate units located, respectively in the fire box and ash pit, each grate unit comprising side irons, the said side irons being inclined upwardly and forwardly, and each formed in its upper edge, with a series of concave recesses, grate bars extending, one behind another, between the side irons, each of said bars being provided, at its ends with trunnions seating in corresponding recesses in the side irons, each grate bar including a depending portion and a rearwardly extending portion at the upper edge of the depending portion, the last mentioned portions having slots therein extending forwardly from their rearwardly edges, each of the depending portions having a forwardly extending flange, at its lower edge, and an arm extending downwardly from the flange, an actuating bar, and a pivotal connection between said bar and each of said arms, whereby the grate bars may be tiltably adjusted.

2. A fuel burning structure of the class described comprising a fire box, and an ash pit, upper and lower grate units located respectively in the fire box and ash pit, each grate unit comprising spaced side irons, the side irons of the lowermost grate unit having their upper edges concaved adjacent one end, the side irons of the uppermost unit having convex edges adjacent their forward end and adapted to be received by the concaved edges of the lower unit, angular-shaped grate bars rockably mounted between the side irons of each unit, said side members of the upper unit having series of equidistantly spaced arcuately arranged apertures, a rod adapted to be selectively arranged in corresponding apertures of said members, socket members carried by said rod, a hook having its shank passed through each socket member, a transverse rod from which the hooks are suspended, a nut threaded on the shank of each hook and arranged directly beneath the adjacent socket member, whereby the upper grate unit can be arranged at any desired angle with relation to the lower unit.

In testimony whereof I affix my signature.

HARRY R. RILEY.